United States Patent

[11] 3,604,439

| | | |
|---|---|---|
| [72] | Inventor | Laddie M. Thomka<br>Midland, Mich. |
| [21] | Appl. No. | 5,568 |
| [22] | Filed | Jan. 26, 1970 |
| [45] | Patented | Sept. 14, 1971 |
| [73] | Assignee | The Dow Chemical Company<br>Midland, Mich. |

[54] SUPPORT STRUCTURE
9 Claims, 4 Drawing Figs.

[52] U.S. Cl. ..................................................... 135/4
[51] Int. Cl. ..................................................... A45f 1/16
[50] Field of Search ........................................... 135/4, 7.1, 1, 3

[56] References Cited
UNITED STATES PATENTS

| 1,170,188 | 2/1916 | Rasmussen et al. | 135/4 |
| 1,509,881 | 9/1924 | Severin | 135/4 |
| 2,757,677 | 8/1956 | Denn | 135/3 |

Primary Examiner—Kenneth Downey
Attorneys—Griswold & Burdick, Richard G. Waterman and Lloyd E. Hessenaur, Jr.

ABSTRACT: A structural framework for tarpaulins, camouflage netting or other such covers. The framework comprises adjustable interchangeable lightweight struts, the adjustment being provided by a joint mechanism which comprises mating rotatable heads on the ends of the struts. The joint mechanism permits locking the structure's struts at desired angles to form, as an example, arches. Such arches can be connected with other like arches to form the framework. Part of such interconnection is facilitated by transverse flanges extending from certain ends of said struts. When not in use or for transport, the joint mechanism of the struts permits folding of the struts compactly together.

PATENTED SEP 14 1971　　3,604,439

INVENTOR.
Laddie M. Thomk[a]
BY
Lloyd E. Hesse[mer]
ATTORNEY

SUPPORT STRUCTURE

The invention herein described was made in the course of or under a contract with the Department of the Army.

In the design of support structures for use as a framework for tarpaulins, camouflage netting or other such covers, it is desirable that the framework be light weight, quickly erectable and collapsible, self-supporting, compactly stored and dielectric. It is particularly desirable that it be capable of being erected by joining multiples of similar units so that the number of different parts is kept to a minimum. The framework structure should also be able to withstand high winds, at least 40 knots per hour, and snow loads of at least 3 inches.

Briefly, the present invention evolves about an adjustable joint mechanism which can be adapted to standard struts of a structural framework so that in effect all that is needed to build up such a framework for tarpaulins or other covers are the strut members including the joint mechanism. The joint mechanism is incorporated into possibly one and generally no more than three basic types of struts so as to effect a swivel joint interconnection between struts which can be held together by a nut and bolt or like means. One end of such a strut can include flanges extending outwardly from the strut stem in T-shaped fashion adaptable to receive other struts at a ninety degree angle from the first strut's stem. By changing the angle between the struts, a structure can be made taller or lower, shorter or wider depending on the particular need. The swivel connection between the basic struts forming the joint mechanism is offset so that two struts can be collapsible with their stems generally in alignment one with the other for compact storage.

Yet additional objects and advantages of the present invention are even more apparent when taken in conjunction with the accompanying drawing in which like characters of reference designate corresponding material and parts throughout the several views thereof, in which.

Figure 1:
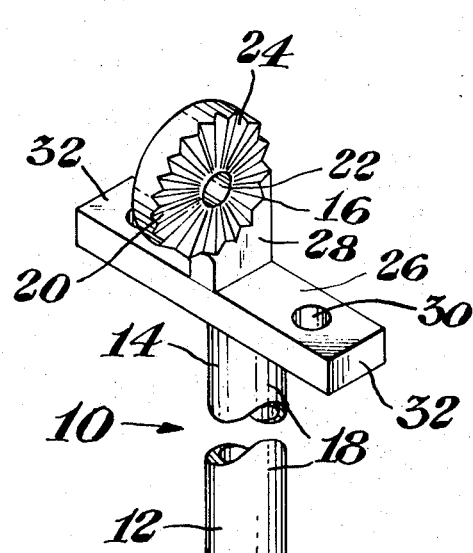
FIG. 1 is an isometric view of a strut embodying the concepts of the present invention.

Referring now more particularly to FIG. 1 there is shown a strut 10 having a standard lower end 12 and a T-end 14. Standard end 12 includes a rounded head 16 coming off of strut stem 18, a roundness in the head 16 being offset to one side of the stem 18. The offset is illustrated as the portion 20 of the head 16. An aperture 22 is located centrally through the head, its center forming the radius for the curve forming the head 16. Because the head is offset from the stem 18, the aperture 22 is likewise offset, with a line through its center parallel with the strut's stem preferably passing to one side of the stem. One face of the head 16 has serrated teeth 24. The serrated teeth are preferably no greater than a fifteen degree angle from one another about the radius of the head 16. If desired, raised edges (not shown) about the periphery 35 of each head 16 can indicate various angular dispositions.

The T-end 14 also includes a head 16 identical with that in the standard end 12 only with flange 26 extending transversely through the stem 18 and preferably forming a right angle with flat face 28 of the head 16. Holes 30 are located in each wing 32 of the flange 26, preferably towards the outer end of the wing so that there will be sufficient space for mating of the wing with a head 16 of another strut, the connection of the two struts to be later described with respect to FIG. 2.

In practicing the principles of the present invention, no more than three types of struts need be employed. One would be the strut shown in FIG. 1 having a standard end 12 and a T-end 14 which, for convenience, will be designated as strut a. In many structural frameworks, only this strut a is needed. Another strut would be one which has standard ends 12 at both of its extremities which, for convenience, can be designated as strut b. The other strut would be one which will have T-end 14 at each of its extremities which shall be designated as strut c. Each of the struts, of course, can be readily made from many materials such as wood, metal or plastic and in either solid or tubular form whichever is desired for a particular framework application. For example, in a particular embodiment, the stems of the struts can be made from dielectric materials such as high density polyethylene or styrene acrylonitrile butadiene copolymer. They can be in the form of tubing stock with a 1½ inches outside diameter having a ⅛ inch thick wall; the material having a yield tensile strength of about 4,000 p.s.i. While the stem 18 is preferably tubular, the heads 16 can be of solid injection molded disks, for example, made of the same material as the stems and secured to the stems by an epoxy resin or other strong adhesive.

Figure 2:
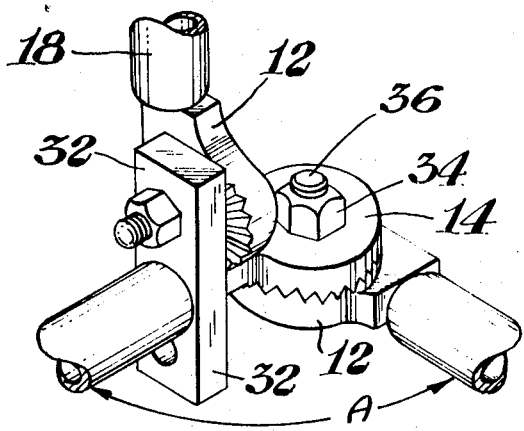
FIG. 2 is an isometric view of three such struts joined together.

The interconnection and cooperation of the struts is best illustrated in FIG. 2. Here a T-end 14 is connected with a pair of standard ends 12 and are held together by a nut 34 and bolt 36 arrangement. Of course, it is understood that a toggle bolt might be used instead. A nut fixed with each of the apertures and a bolt fixed with each of the heads, but rotatably mounted therein, could alternatively be used in the event loss of nuts and bolts presents a problem. The bolt could also be made of strong material such as metal or glass reinforced plastic from about ⅛ inch to ⅝ inch in diameter, and a plastic wing nut could be employed instead of a hex nut for quick and easy locking and unlocking. It can be readily appreciated that the interconnection between the heads 16 of the standard end 12 and T-end 14 can give a desired angle A which can be either acute or obtuse depending on the purpose for which the arch formed by these two ends is to be employed. Another standard end 12 connected to wing 32 is shown having its stem 18 going parallel outwardly from the wing 32. However, such stem 18 does have the possibility of going outwardly at other angles to the wing 32 where necessary or desired.

Figure 3:
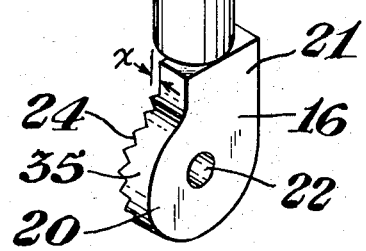
FIG. 3 is an isometric view showing two such struts joined together and collapsed for shipping and/or storage.
Figure 3:
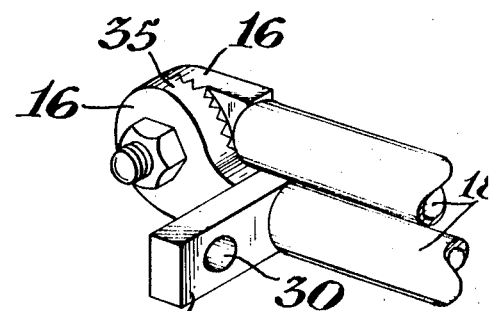

Referring back to FIG. 1, face 21 of head 16 is preferably substantially flush with the surface of stem 18. Since the width of peripheral edge 35 of each head 16 is about one-half the diameter of stem 18, the serrated face of the head will be offset from the opposite surface of stem 18 a distance X, X being about one-half the diameter of stem 18 in the preferred embodiment shown. One important reason for the offset is to facilitate collapsing and storage of struts one with the other, as illustrated in FIG. 3, for example. With each head 16 having a width about one-half the diameter of the stem 18, one head 16 can be abutted to another so that the stems 18 of adjacent struts will be substantially in alignment when they are collapsed. If some nonalignment of collapsed stems can be tolerated the heads can be located with respect to the stem in another position, such as centrally of the stem's cross section, or the width of the heads can be made wider or narrower as desired. However, for purposes of the preferred embodiment, the head is offset from the stem only on one side and about one-half the diameter of the stem. To facilitate collapsing of more than two struts together, it is preferable that the offset portions 20 of the heads 16 of any given strut be disposed in opposite directions. For example, in FIG. 1, it is preferable that offset 20 of one of the heads 16, such as that of standard end 12, be disposed 180° from that shown if collapsing of more than two such struts is important.

Figure 4:
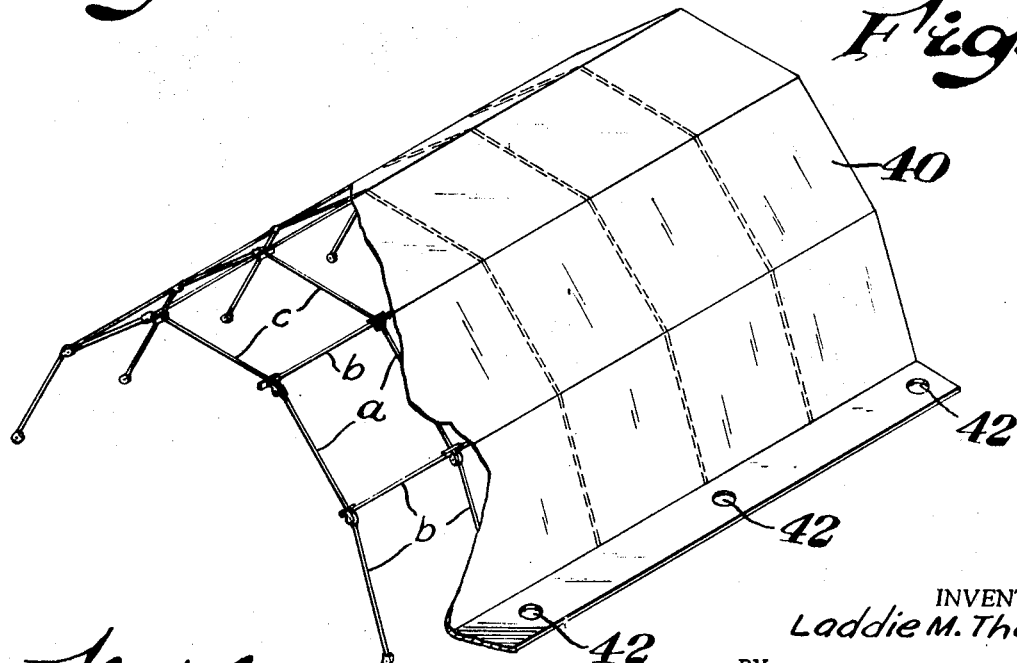
FIG. 4 is an isometric view of a structural framework employing the struts of the present invention to form a Quonset hut-type modular structure.

A framework structure comprised of struts of the present invention is illustrated in FIG. 4. Shown is Quonset hut-type framework employing struts a, b, and c. As mentioned earlier, strut a comprises a strut having a T-end 14 and a standard end 12, strut b has two standard ends 12, and strut c has two T-ends 14. The Quonset hut-type framework is comprised of a plurality of five struts forming arches connected together to form modular units. The center section of each arch can be a strut c. Connected to both ends of the center section strut c, and downwardly from each strut a extends a strut b. Each of the arches is interconnected by struts b to form modular units which can go on successively for the length of the framework structure desired. Alternatively, where desired, the same general type of framework structure (not shown) can be formed from just struts *a*. Here five struts *a* are connected one to the other, standard end to T-end successively to form each arch. Then the arches are interconnected by more struts *a*. Here several of the flanges of T-bar ends will go unused, but that may be of little consequence considering the convenience of using just one type of strut.

Covering the framework of FIG. 4 can be a tarpaulin or camouflage netting or screen 40 which can include tiedown or stake-down holes 42 at its bottom periphery to give the necessary cover to complete the shelter or structure. By changing the angle of the struts and/or by joining more or fewer struts forming each arch, the length, height and/or width of the structural framework can be increased or decreased so that the profile of the hut arrangement can be made taller, or more squat for a lower profile.

Other structures which can also be made from the struts here disclosed also would come within the concepts of the present invention. Likewise, it may be possible to form adjustable joints including heads 16, with and without flanges 26, which joints are separable from the stems 18 to permit different length stems to be used as desired. Accordingly, while certain representative embodiments and details have been shown for the purpose of illustrating the invention, it will be apparent to those skilled in the art that various changes and modifications can be made therein without departing from the spirit and scope of the invention.

Accordingly, what is claimed is:

1. A structural framework including a plurality of interchangeable struts, each said strut including a stem and a head at at least one end of said stem, said head being disk shaped with generally flat faces and a width no greater than about half the diameter of said stem, said head having a generally central aperture and rounded about the major portion of its periphery with part of its curved portion offset from the axis of said stem, at least two such standard heads being pivotally interconnected whereby the rounded character of said heads permits the struts to depend from one another from an acute angle to an obtuse angle to form archlike, domelike, tentlike, generally straight or bent wall structures, or the like, over which covers can be placed.

2. The framework of claim 1 wherein one of said strut faces is substantially flush with the surface of said stem to form a standard end on said strut.

3. The strut of claim 2 wherein the other of said faces includes indexing means extending radially about said aperture.

4. The strut of claim 3 wherein a flange extends transversely of said stem adjacent said stem and said head to form T-end on said strut.

5. The strut of claim 4 wherein a wing of said flange forms a right angle with a face of said head.

6. The strut of claim 5 having a standard end at one of its extremities and a T-end at its other extremity.

7. The strut of claim 5 having a T-end at each of its extremities.

8. The strut of claim 4 having a standard end at each of its extremities.

9. A combination of struts of claim 4 joined together wherein a T-end of one strut has its head joined with the head of another strut and at least one of the wings of the T-end joined with the head of a third strut.